A. Beckwith,
Horse Collar.
No. 97,592.  Patented Dec. 7, 1869.
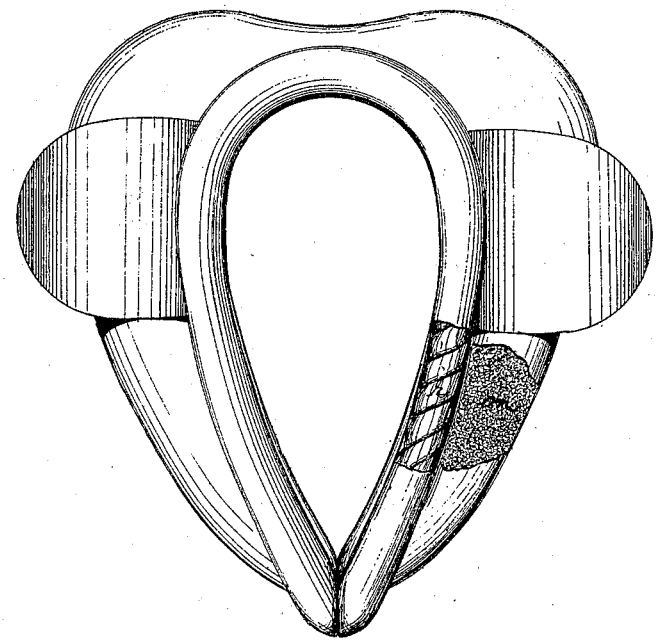
Witnesses.
C. A. Pettit
S. C. Kemon
Inventor.
A. Beckwith
by Munn & Co.
Attorneys.

United States Patent Office.

A. BECKWITH, OF NEW ORLEANS, LOUISIANA.

Letters Patent No. 97,592, dated December 7, 1869.

IMPROVEMENT IN HORSE-COLLARS.

The Schedule referred to in these Letters Patent and making part of the same.

*To all whom it may concern:*

Be it known that I, A. BECKWITH, of New Orleans, in the parish of Orleans, and State of Louisiana, have invented a new and improved Horse-Collar; and I do hereby declare that the following is a full, clear, and exact description of the construction and operation of the same, reference being had to the accompanying drawing, making a part of this specification, in which—

My invention is represented by a front view, a portion having been broken away to reveal the internal construction of the collar.

The object of this invention is to provide for public use a cheap, substantial, and durable collar for working-horses, and which will be easier for the neck than those heretofore employed.

This object I accomplish by making the front rim of the collar of rope, $r$, and the pads of moss, straw, or other similar material, $m\ m$, the whole being suitably covered with duck or canvas instead of leather, the latter being a much more expensive material than the former.

They may be made open at the top, with a buckle to secure them, or they may be closed at the top entirely.

The rope may be the ordinary twist rope made from cotton, flax, hemp, leather, or other material from which rope can be manufactured, and it may be made in the ordinary way by torsion, or the fibres may be made longitudinally, and wrapped and secured according to the fancy of the manufacturer.

The most important advantage in this improvement consists in the self-adaptability and adjustability of the rope, and consequently of the entire collar, to the neck of the animal.

At the same time the collar is cheaper than any heretofore brought before the public, since it can be manufactured for twenty-five cents, whereas the cheapest collar for plantation use ever before in the market has not cost less than one dollar. In fact, any person of ordinary mechanical skill can easily manufacture these collars for his own use, at a mere nominal cost.

The moss is furnished in abundance from trees growing in the South, and the rope and canvas are durable and cheaper than leather, and more easily fashioned and sewed together by an inexperienced hand.

Having thus described my invention,

What I claim as new, and desire to secure by Letters Patent, is—

As a new article of manufacture, a horse-collar, having a rope foundation for the front rim, but otherwise made like any ordinary collar, substantially as set forth.

To the above specification of my improvement, I have set my hand, this 20th day of July, 1869.

A. BECKWITH.

Witnesses:
  HENRY THARP,
  W. D. ASH.